(12) United States Patent
Polster

(10) Patent No.: US 6,355,104 B1
(45) Date of Patent: Mar. 12, 2002

(54) ARTICLE TREATING APPARATUS AND METHOD AND CONTROL SYSTEM THEREFOR

(76) Inventor: Louis S. Polster, 2205 Marthas Rd., Alexandria, VA (US) 22307

(*) Notice: Subject to any disclaimer, the term of this patent is extended or adjusted under 35 U.S.C. 154(b) by 0 days.

(21) Appl. No.: 09/197,202

(22) Filed: Nov. 20, 1998

(51) Int. Cl.$^7$ .............................................. B05C 3/09
(52) U.S. Cl. .................. 118/666; 118/667; 118/712; 118/411; 118/412; 118/423; 118/429; 118/500; 134/901
(58) Field of Search ................. 118/666, 667, 118/712, 411, 412, 423, 429, 500; 427/164, 169, 434.5, 434.7; 134/901, 102.2; 422/300; 8/506, 507; 264/1.32, 2.6; 99/344, 342, 336, 330

(56) References Cited

U.S. PATENT DOCUMENTS

| | | |
|---|---|---|
| 243,107 A | 6/1881 | Conger |
| 1,281,762 A | 10/1918 | Carpenter |
| 1,404,309 A | 1/1922 | McDonald |
| 2,609,269 A | 9/1952 | Ryan et al. |
| RE29,073 E | * 12/1976 | Kinney et al. .............. 118/500 |
| 4,245,991 A | 1/1981 | Haddad et al. |
| 4,438,159 A | 3/1984 | Weber |
| 4,442,788 A | 4/1984 | Weis |
| 4,455,322 A | 6/1984 | Weber |
| 4,476,162 A | 10/1984 | Ireland |
| 4,915,986 A | 4/1990 | Elias et al. |
| 5,028,358 A | * 7/1991 | Blum .......................... 264/1.4 |
| 5,052,337 A | 10/1991 | Talcott et al. |
| 5,090,430 A | * 2/1992 | Nixon ...................... 134/102.2 |
| 5,096,457 A | 3/1992 | Nakagawa et al. |
| 5,153,027 A | 10/1992 | Spagnoli |
| 5,201,955 A | 4/1993 | Chika et al. |
| 5,352,866 A | * 10/1994 | Cartwright et al. ........... 99/344 |
| 5,453,100 A | 9/1995 | Sieloff |
| 5,560,751 A | 10/1996 | Hoshiyama |
| 5,665,420 A | * 9/1997 | Janssen et al. ............. 427/2.12 |

FOREIGN PATENT DOCUMENTS

| | | |
|---|---|---|
| JP | 53-97064 | 8/1978 |
| JP | 53-140378 | 12/1978 |

OTHER PUBLICATIONS

Frames, a Medical Economics Company "Surfacing & Finishing" 119E, 1998, vol. XXV—No. 43, pp. 96–101.

* cited by examiner

*Primary Examiner*—Laura Edwards

(57) ABSTRACT

An apparatus, method and control system involve treating articles in one or more of a plurality of liquid treatment bath chambers. The apparatus includes one or more article raising and lowering devices and a plurality of treatment bath chambers, preferably having separate heaters, temperature and level monitors, filling and draining devices, and devices for keeping treatment bath components in suspension. The method preferably includes treating articles, preferably eyeglass lenses, by supporting the articles on an arm and dipping them into one or more of the plurality of treatment bath chambers, which may separately contain assorted coating liquids such as tint coatings, UV protection coatings, scratch resistance coatings, neutralizing liquids for removing tinting, and rinsing liquids. The control system preferably controls which bath chamber or bath chambers are to be used for each treatment liquid, the temperature of each bath liquid, the liquid level in each bath chamber, the duration of treatment in each bath, and the speed of withdrawal from each bath for providing the option of different gradient coatings on articles. The control system also preferably manages the power usage in the system, when necessary, by rotating which heaters receive power until all of the chambers are fully heated, at which time the control system only provides power to heat those chambers whose temperatures have dropped to a predetermined temperature.

35 Claims, 8 Drawing Sheets

ARTICLE TREATING APPARATUS AND METHOD AND CONTROL SYSTEM THEREFOR

FIELD OF INVENTION

This invention relates to applying a liquid treatment composition to articles, and more particularly, to apparatus, methods and control systems that selectively apply treatment compositions, such as tints and the like, to articles, such as eyeglass lenses, by dipping the articles into liquid treatment baths containing the treatment compositions.

BACKGROUND

In the conventional manner of tinting eyeglass lenses, the lenses are maintained in a vat of hot tinting solution for a period of time until the lenses are tinted to a desired degree. Most of the equipment used today to tint lenses is simply modified food warming equipment. Instead of water, however, a fluid heat transfer medium, such as polyethylene glycol, is heated by heating elements located in the bottom of an outer tank. The heat transfer medium, in turn, heats a number, generally eight to twelve, and often nine, of one quart stainless steel steam table pans, pots or chambers contained in the outer tank. Dyes are typically dispersed in water. The water is heated to 200° Fahrenheit, which is often the ideal temperature for tinting.

The heat transfer fluid heats all of the pans evenly. Because of this, it is difficult to heat one or more of the pans to a different temperature from other ones of the pans. If all of the pans are left uncovered, because of thermodynamic effects including water vapor loss, etc., the indirect heat provided to the pans by the heat transfer medium will be incapable of heating all of the pans to 200° F., assuming the modified food warming equipment is powered using standard power lines at110 VAC, which produces a practical limit of about 1800 Watts.

With all of the pans covered, the maximum temperature of the heat transfer medium may reach above 212° F., although the temperature will not rise significantly higher, since the pans will boil over. However, as soon as a lid is removed from a pan, the temperature will begin to drop. Also, when the lid is removed, the water level will usually tend to drop, and water will almost continuously have to be added. Restoring the water level will tend to further reduce the bath temperature.

Accordingly, despite the preferred temperature for dye baths of around 200° F., the actual temperature of most conventional dye baths may generally be expected to be between about 150° F. and 160° F. This often causes distortion in the color of lenses tinted and also tends to unbalance the colors in the dyes. As a result, tinted lenses often require that their tinting be readjusted, a process which requires substantial time and artistic effort on the part of the person adjusting the coloring.

In order to provide tint gradients on lenses, the lenses are conventionally raised and lowered repeatedly, the lenses preferably being lowered a shorter distance as the dipping progresses, such that the lowest part of the dipped lenses contacts the treatment solution the most. As it is often desirable to have the darkest tinting at the top of the lenses, the lenses are typically held upside down as they are dipped into the treatment solution. The earliest gradients were formed on lenses by hand. Manually dipping the lenses up and down was the only practical way to form gradients by hand. The commercial machines used today still use this same up and down "dipping" motion approach.

The conventional steam table pans are cleaned by lifting them out of the tinter machine, dumping the contained water and dye, and cleaning the pan.

An example of conventional lens dyeing methods and apparatus that give a continuous colored density gradient is provided by U.S. Pat. No. 5,096,457 to Nakagawa et al. U.S. Pat. No. 5,453,100 to Sieloff discloses a method for color dyeing polycarbonate in which a graded tint is provided by slowly withdrawing the immersed polycarbonate material from a dye or pigment-containing mixture. A preparation of differential thickness coatings by dip coating, where the substrate is pivoted, is disclosed in U.S. Pat. No. 5,153,027 to Spagnoli.

An eyeglass tinting machine which utilizes a microprocessor-controlled stepping motor to control the vertical oscillations of a support structure is illustrated in U.S. Pat. No. 4,915,986 to Elias et al. In one mode, a gradient tint is achieved by lowering the top portions of the eyeglass lenses into a dye vat to the line at which the gradient starts, subsequent to which the machine will simultaneously reciprocate the lenses up and down and slowly withdraw them from the dye so that they are moving vertically at all times. An annular gradient optical lens tint system which may be used with the Elias et al. machine is disclosed in U.S. Pat. No. 4,201,955 to Chika et al.

U.S. Pat. No. 5,052,337 to Talcott et al. discloses a lens dyeing method and apparatus, including a heating element contacting a dyeing tank and a heat controller and sensor for dye solution temperature. The dye solution temperature is maintained and controlled within a preselected tolerance by a temperature controlling unit and its associated heater, which is connected to the dyeing tank. Talcott et al. also describes an automatic water fill apparatus associated with the dyeing tank to maintain the dye level without operator intervention. Additionally, the dyeing tank has associated with it a stirring device, preferably a magnetic stirrer. Talcott's method uses a dye solution having an elevated boiling point to dye the lens material at temperatures above 212° F. While Talcott et al. mentions the possible use of more tanks, the maximum possible to be heated at one time, due to power limitations, would be four tanks, assuming standard power lines, providing 110 VAC, is used.

SUMMARY OF THE INVENTION

A common limitation of the above-described devices and methods is the lack of an integrated and automated overall control system and apparatus for controlling and maintaining variables for different treatments including optimal temperatures, treatment duration, surface gradient treatments, etc.

This invention provides an apparatus, methods and control systems to dip treat articles in one or more of a plurality of liquid treatment bath chambers.

The apparatus includes one or more article raising and lowering devices and a plurality of treatment bath chambers. In one exemplary embodiment, each bath chamber has a separate heater, separate temperature and level monitors, separate filling and draining devices, and aerators to keep the treatment bath components in suspension.

One exemplary embodiment of the method includes treating articles, preferably eyeglass lenses, by supporting the articles on an arm and dipping them into one or more of a plurality of treatment bath chambers. In one exemplary embodiment, each treatment bath chamber separately contains assorted treating liquids such as tint coatings, UV protection coatings, scratch resistance coatings, neutralizing liquids for removing tinting, and rinsing liquids.

The control system can be provided with data identifying which bath chamber or bath chambers contain a particular type of treatment bath liquid. In one exemplary embodiment, the control system controls, for example, the temperature of each bath liquid, the liquid level in each bath chamber, the duration of treatment in each bath, and the speed of withdrawal from each bath to provide different gradient coatings on the articles. The control system can also generate an audible and/or visual signal of the end of the treatment duration in each bath. In another exemplary embodiment, the control system can also manage the power usage in the system, when necessary, by controlling which heaters receive power until all of the chambers are fully heated. Subsequently, the control system only provides power to heat those chambers whose temperatures have dropped to a predetermined temperature.

These and other features and advantages of this invention are described in or are apparent from the following detailed description of embodiments.

BRIEF DESCRIPTION OF THE DRAWINGS

Embodiments of this invention will be described in detail, with reference to the following drawing figures, in which.

DETAILED DESCRIPTION OF EMBODIMENTS

Figure 1:
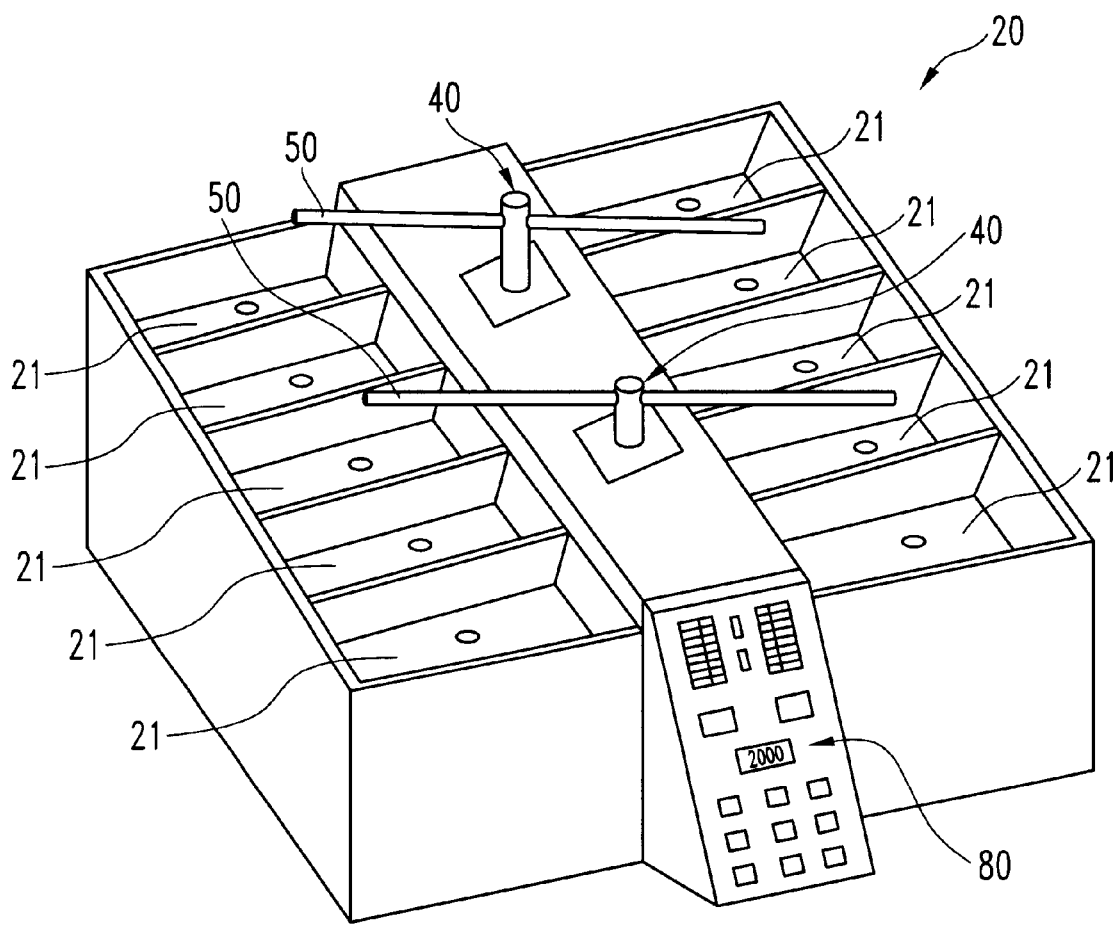
FIG. 1 is a perspective view from above of one exemplary embodiment of an article treating apparatus in accordance with this invention.

One exemplary embodiment of an apparatus of this invention includes a plurality of treatment bath chambers that can be filled with treatment compositions such as tint coatings, UV protective coatings, scratch preventive coatings, neutralizing liquids for removing other coatings, rinses and the like. Each of the treatment bath chambers preferably has its own associated heater located on the outside of the chamber for individually heating each bath. In one exemplary embodiment, each treatment bath chamber also has at least one temperature sensor to monitor the temperature inside that bath. Also, in one exemplary embodiment, each individual bath chamber has a drain to drain out spent treatment composition, and a liquid (e.g., water) filling device for initially filling that bath chamber and to provide replacement liquid to that bath. The apparatus of this exemplary embodiment also includes at least one integral raising and lowering device that lowers articles to be treated into one or more of the bath chambers and that lifts the articles back out of the one or more chamber(s). In an alternate exemplary embodiment, the raising and lowering device is also a transferring device that transfers the articles to a second bath chamber and that lowers and raises the articles in and out of the second chamber. The raising and lowering device may then be able to proceed to third and fourth chambers and so on. In one exemplary embodiment, the raising and lowering device raises and lowers the articles using a stepper motor, which turns a threaded screw or the like. This causes a correspondingly internally threaded and engaged piston or actuator block to move up or down under the power of the stepper motor.

One exemplary embodiment of an integral control system of this invention includes an input device, such as a keypad control panel, on a side of the apparatus. The control system controls multiple items, such as: turning on and off the apparatus; filling and draining each individual chamber; maintaining the levels of the liquids contained in each of the individual bath chambers; controllably heating or non-heating of treatment liquids contained in each individual bath chamber; maintaining the liquids at the selected temperatures based on signals received from temperature sensors associated with each of the bath chambers; tracking the time articles have been treated in each treatment bath; providing auditory and/or visual signals to indicate how long articles have been treated and when and where the desired duration of treatment has been completed; controlling the raising and lowering speeds of the articles to be treated into and out of the baths, including controllably forming gradients on the articles by changing the removal speed over the period removed; and/or controllably transferring the articles to be treated between a first bath and a second bath. In one exemplary embodiment, the control system is provided with information about the proper conditions of different types of treatment compositions, such that the control system will automatically set the treatment bath to such conditions. For example, different treatment compositions require different temperatures, and some compositions are not water-based. For example, many tints need to be heated to about 200° F. and are water soluble; hard coats generally need to be heated to about 205° F. and are not water soluble; neutralizers generally need to be heated to about 200° F. and are not water soluble; UV coats generally need to be heated to about 205° F. and are water soluble; and rinsing is preferably done at about 200° F. The control system can automatically heat the individual chambers to, and maintain, those temperatures, depending upon which treatment composition is present in each chamber. Also, the control system can prevent initially filling and refilling certain chambers with liquid as desired. For example, filling and refilling chambers containing compositions which are not water based is prevented when the only make-up liquid is water. Specific treatment liquids and their associated use temperatures are known and can be readily selected by those of ordinary skill in the art without undue experimentation.

One exemplary embodiment of the methods for treating articles of this invention includes transporting the articles to one or more treatment baths, treating the articles for a period of time, and then removing the treating articles. Removing the article may include changing removal speed such that a gradient coating is formed on the treated article. The method may further include transferring the treated article to a second treatment bath and treating the treated article in that second treatment bath.

FIG. 1 illustrates one exemplary embodiment of a lens tinting machine 20 of this invention usable with the methods of this invention and which can include the control system of this invention.

The lens tinting machine 20 includes a plurality of treatment bath chambers or pots 21. One or more lift assemblies 40, lowers and raises the articles to be treated into the baths 21. Each lift assembly 40 includes one or more support arms 50. As shown in FIG. 1, the two support arms 50 are able to insert articles into the ten treatment bath chambers 21. While the lift assemblies 40 are used to automatically treat articles in some of the treatment bath chambers 21, manual treatments can be made in some, or all of the other treatment bath chambers 21.

The lens tinting machine 20 also includes a lens tinting management system and a keypad 80, as illustrated in FIG. 1. The keypad 80 can be substituted or preferably supplemented with one or more data input/output ports, such as port 89, to allow control software providing the same controlling functions to be used in an associated computer.

Figure 2:
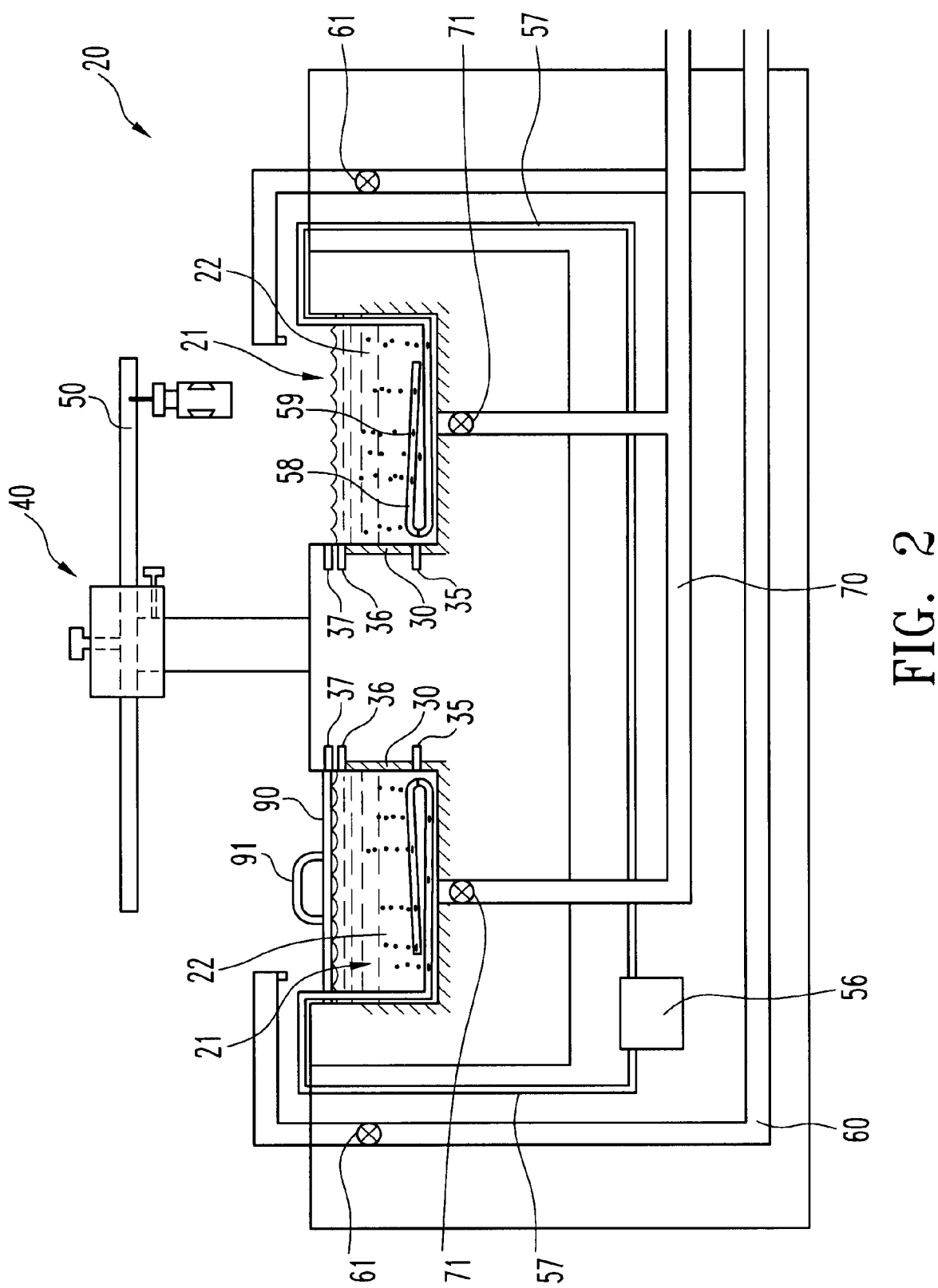
FIG. 2 is a cross-sectional side view of one exemplary embodiment of an article treating apparatus in accordance with this invention.

As shown in FIG. 2, a heater 30 may be bonded to the outside of each treatment bath chamber 21 to directly heat the outside of that treatment bath chamber 21. Temperature sensors 35, 36 and 37 are preferably located below, at, and above, respectively, the intended surface of a treatment liquid 22 provided on each treatment bath chamber 21.

As shown in FIG. 2, a gas pumping device 56, preferably an aerator, is provided to pump gas bubbles at least intermittently into, preferably, the bottom of each treatment bath chamber 21 to maintain dye or other coating or treatment materials suspended in solution and also to avoid temperature stratification. Any problem with oxidizing the treatment materials, such as dye, may be prevented by disposing of the dye after a period of usage, such as about a week. Additionally or alternatively, inert gas bubbles could be used. The pumping device 56 sends the gas through one or more supply lines 57 to exit sections 58. Each exit section may include a plurality of bubble ports 59. Using bubbles is more effective than the stirring methods used in the known products. Gases other than air may optionally be used by the gas pumping device 56. Examples of other gases which may used include nitrogen and carbon dioxide, both of which would have the advantage of not oxidizing the treatment agents contained in the bath. Oxygen is another gas that may be used as appropriate.

A filling assembly 60 with an on/off valve 61 may be provided for each treatment bath chamber 21 in order both to initially fill the treatment bath chamber 21 prior to use, and to refill the treatment bath chamber 21 to replenish liquid lost due to evaporation or otherwise.

A draining assembly 70 with an open/close valve 71 is also provided for each treatment bath chamber 21. Also, in one exemplary embodiment, the inside surfaces of each of the treatment bath chambers 21 are coated with glass or another ceramic material. The ceramic coating makes it easier to clean the chamber surfaces than would be possible using the uncoated surfaces generally used in known devices. In general, the heaters 30, the filling assembly 60 and the drawing assembly 70 are used with treatment bath chambers 21 which are fixed into position. Thus, the ceramic coating makes cleaning substantially easier and also protects the underlying stainless steel surface of the treatment bath chamber 21 from the slightly corrosive effects of the tints.

A cover, such as a floating cover 90, as shown in FIG. 2, may optionally be used with one or more of the treatment bath chambers 21 to reduce the amount of heat loss through the open top. The floating cover 90 has a handle 91.

Figure 3:
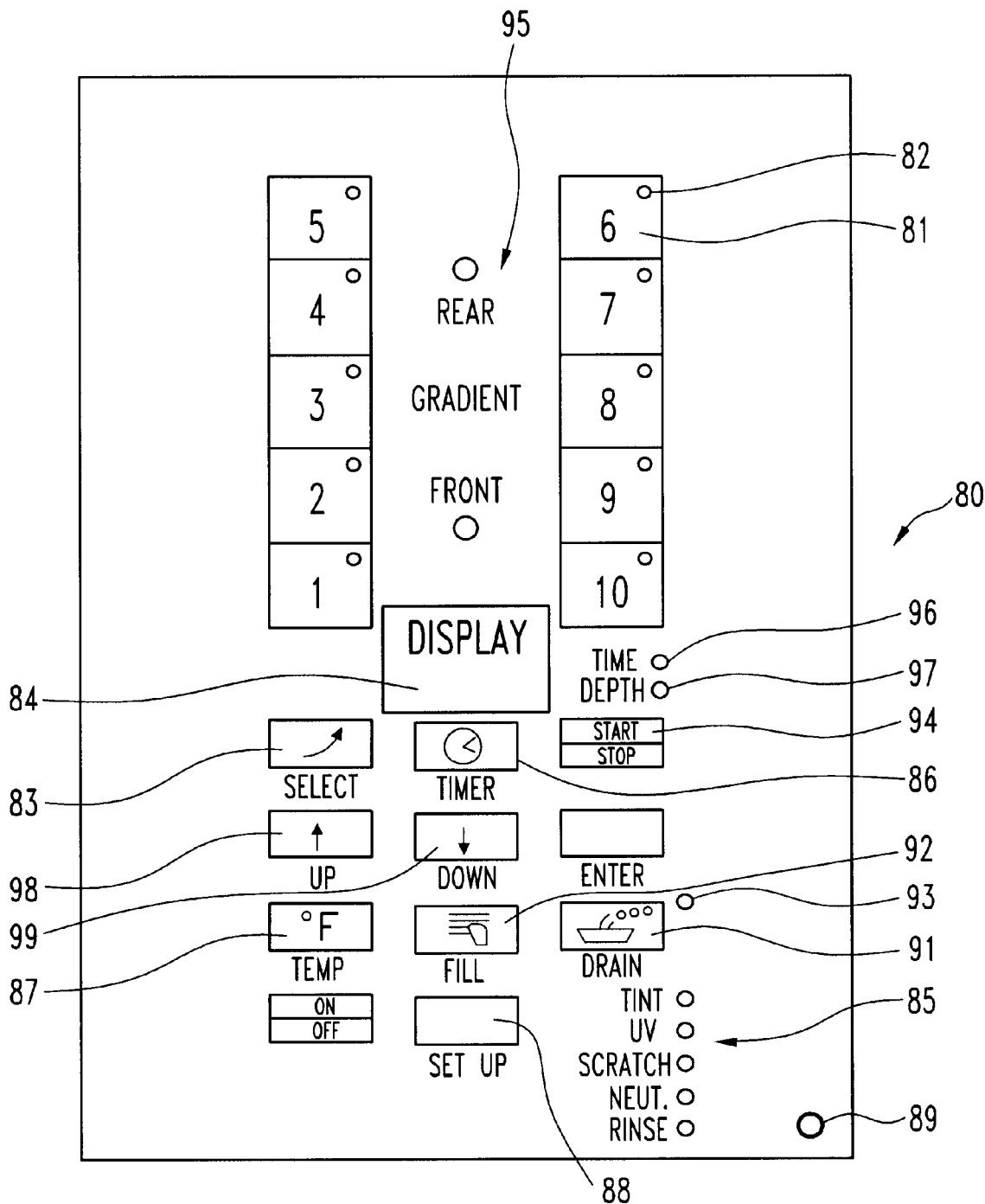
FIG. 3 is a side view of one exemplary embodiment of a control input device which may be used as part of an article treating apparatus, all in accordance with this invention.

FIG. 3 shows the keypad 80 in greater detail. As shown in FIG. 3, each treatment bath chamber 21 has a corresponding indicator 81 that includes a light, such as an LED 82. The lights 82 are continuously lit for each of the chambers 21. When a select button 83 is pushed, one of the illuminated indicator lights 82 or one of indicator lights 95 flashes to indicate which one of the treatment bath chambers 21 that the displayed information refers to. Repeated actuation of the select button will preferably sequentially cause each of the treatment bath indicator lights 82 to flash and then sequentially cause the indicator lights 95 for the front (or back) and then the back (or front) of the two lifting assemblies to flash. When a bath indicator light 82 flashes, the desired treatment conditions of time and temperature can also be entered. When either of the two indicator lights 95 are flashing, the desired gradient or nongradient parameters of time, curve, depth, and start (just above the surface of the treatment liquid) location can be entered. Pushing select again will cause a different illuminated indicator light 82 to flash referring to another treatment bath chamber 21. Preferably, the select button can be pushed to move the display to indicate information for each of the ten treatment bath chambers 21 and also to indicate the status for the two lift assemblies 40 with a corresponding flashing of one of the illuminated indicator lights 95. The information is displayed on display 84, and can include the temperature in the corresponding treatment bath chamber 21, the time left in the treatment of an article being treated in that treatment bath chamber 21 and whether treatment has been completed. The indicator light 82 preferably uses one color, such as green, to indicate when a treatment bath is ready for use and another color, such as red, when the corresponding treatment bath chamber 21 is not ready, because, for example, it is not at the proper temperature. The display 84 preferably nominally displays the temperature. The display 84 can be changed from displaying the temperature to displaying the timer by pushing button 86. The timer setting can then be changed as described below. Preferably, during a treatment period within a bath chamber 21, the time remaining in the treatment period will be nominally displayed in display 84 and temperature button 87 can be pushed to switch back to displaying the temperature. An indicator light 96 will be illuminated to indicate when the timer function is being displayed. The symbol ° F. or alternatively ° C., as appropriate, will also display when the temperature is displayed. The control panel 80 also includes a set of indicator lights 85 that indicate what type of treatment is being conducted in a selected one of the treatment bath chambers 21.

A timer can be associated with each treatment bath chamber 21 and can be used to measure the amount of treatment time and provide an auditory and/or visual signal when the treatment time is expired. That is, the auditory and/or visual signal will prompt an individual to manually remove the lenses from a bath in which the treatment period has expired.

The desired temperature in a selected treatment bath chamber 21 can be adjusted, for example, by holding the temperature button 87 for a period of time, after which the desired set temperature displayed for that treatment bath chamber 21 will begin to rise. Pushing and holding button 87 again, for example, will cause the desired set temperature for that treatment bath chamber 21 to decrease. Once a desired temperature is set, the control system will cause the temperature of that treatment bath chamber 21 to be adjusted to the desired temperature by activating and/or deactivating the appropriate heating element 30. The timers can be set similarly. For example, pushing and holding the timer button 86 will cause the indicated set time period to rise, first slowly, then quickly. Pushing and holding the timer button 86 again will cause the indicated set time period to decrease in a similar manner.

The setup button 88 prepares the lens tinting machine 20 for operation by allowing for the entering of which treatment bath chambers contain which liquids and for the selecting for specific treatment temperatures and treatment times for each separate bath, such that each of the baths can be heated up to the necessary temperatures. The setup button 88 enables the entry of selected information about each of the baths. By pushing the select button 83, the display and lights 85 will indicate information (temperature, ready for use, timer, treatment liquid type, etc.) about the selected treatment bath chamber. This information can be changed by entering the relevant information into the keypad. For example, information as to whether a tint or other treatment bath is entered. This system will then set a nominal temperature, treatment period (e.g., 10:00 minutes), and whether additional liquid can be added. These values can be adjusted to values other than the nominal values, if desired, using the keypad. After information for a first one of the baths is entered under the setup mode, pushing the select button switches the display to a read out for a second treatment bath chamber. The setup button can then be pushed for the second treatment bath chamber, which can be similarly adjusted, until the different desired treatment conditions for some or all of the individual treatment bath chambers have been entered into the control system.

When the lens tinting machine 20 is not being used, an "IDLE" message will appear in the display 84, and those treatment bath chambers containing liquids will be kept at around 140° F. It is also possible for the on/off button to be an on/idle or on/off/idle button. Alternatively, turning the system off may place the system in IDLE mode.

Filling and draining buttons 92 and 91 are provided to automatically fill and drain, respectively, one of the treatment bath chambers 21 when necessary by controlling valves 61 associated with the filling assemblies 60 and valves 71 associated with the draining assemblies 70. An indicator light 93 is included to indicate when the drain of a particular one of the treatment bath chambers 21 is open.

The start/stop button 94 can be used to start and stop timing of a treatment in one of the treatment bath chambers 21 in conjunction with its timer. By pushing select until one of the indicator lights 95 flashes to indicate that the display is displaying if either of the two lifting (either the front or back) assemblies 40 are currently being used in a gradient or nongradient forming treatment or are being set. Also, when a gradient or nongradient treatment is complete using either of the lifting assemblies 40, the control system will preferably cause an audible signal to be made and also cause the indicator light 95 for that lifting assembly to flash. The up and down buttons 98 and 99 may be used to select between different gradient curves, and can also be used to raise and lower either of the two lifting assemblies 40.

Figure 4:
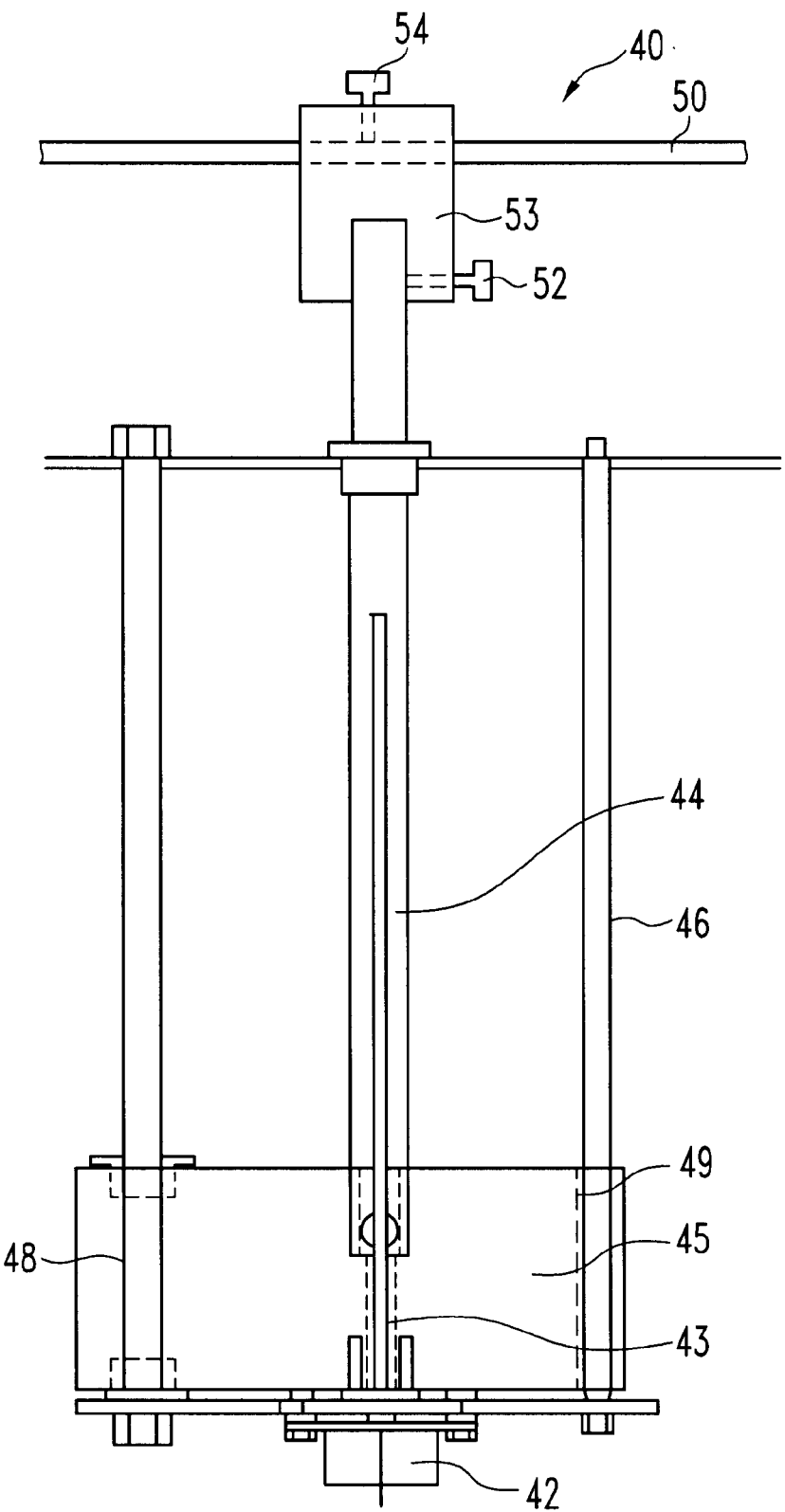
FIG. 4 is a cross-sectional side view of one exemplary embodiment of a raising assembly including a stepper motor which may be used as part of an article treating apparatus in accordance with this invention.

As shown in FIG. 4, a stepper motor 42 having a threaded shaft 43 engages an internally threaded piston or actuator block 45 to provide a step gradient treatment to articles to be treated. Preferably, the actuator block 45, to which an extended member 44 is attached, rides up and down stepwise under the motive force of the motor 42.

As shown in FIG. 4, the support arm 50 is held in position by a block 53. The block 53 has a fastener 54 to allow when the support arm 50 to be flipped over and to slide back and forth. When tightened, the fastener 54 locks the support arm 50 into place. The block 53 also has a second fastener 52 to allow, when untightened, the block 53 to be manually rotated to position the support arm 50 over one of the treatment bath chambers 21. When fastener 52 is tightened, the support arm 50 is locked into position over one of the treatment bath chambers 21.

Figure 5:
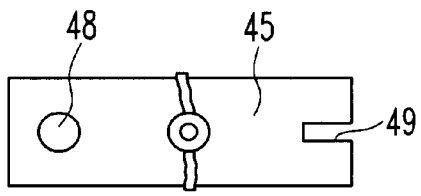
FIG. 5 is a plan view of one exemplary embodiment of an element of the raising assembly which may be used as part of an article treating apparatus in accordance with this invention.

As shown in FIGS. 4 and 5, the block 45 has a bearing 48 and a slot 49. The block 45 is positioned over a pair of guide rods 46 and 47. The guide rod 46 is inserted through the bearing 48. The guide rod 47 is inserted into the slot 49. As the motor 42 turns the threaded rod 43, the block 45 slides along the guide rods 46 and 47. As the motor 42 turns, the extended member 44 raises or lowers the support arm 50. Of course, other suitable mechanisms for raising and lowering the support arms 50 could also be readily implemented by one of ordinary skill in the art without undue experimentation.

Figure 6:
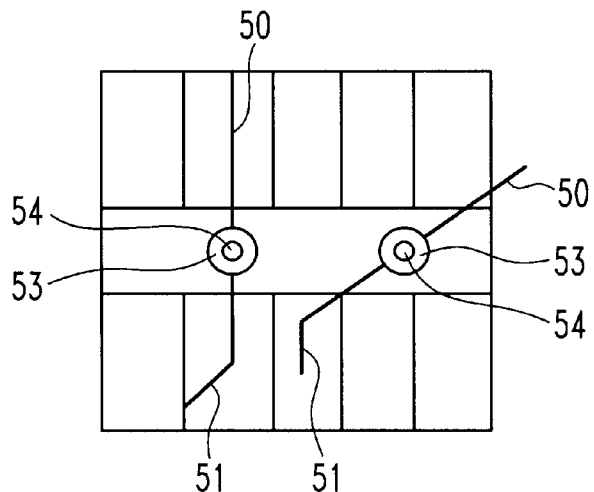
FIG. 6 is a plan view of one exemplary embodiment of an article treating apparatus in accordance with this invention.

FIG. 6 shows a top plan view of the lens tinting machine 20. As shown in FIG. 6, each of the support arms 50 has one straight end and one bent end 51.

At least one of the two support arms 50 should be able to effectively support a set of articles over any one of the treatment bath chambers 21.

Preferably, the article to be treated is taken down to a selected depth a single time, and then incrementally raised by, for example, 0.001 inch increments with no repeated up and down motion. Due to the meniscus effect, this will tend to form a uniform gradient rather than lines of coating. Even if formed, the 0.001 inch lines are invisible to the naked eye. At the end of the treatment, when the article is just out of the treatment bath, a quick jump made up of a series of quick steps may be made in the raising of the article to break off any meniscus attached to the article. While 0.001 inch incremental steps are preferred, any effective size of incremental steps may be made. In one particular exemplary embodiment, the size of the steps should be less than or about 0.025 inches. By leaving the article in at the full depth for a duration of time and then quickly removing the article from the bath, a uniform coating or other treatment with no gradient is produced.

The articles are preferably placed in a dipping apparatus attached to one of the support arms 50 that has been positioned over a desired treatment bath chamber. The timer will preferably cause the motor 42 to raise the support arm 50 to automatically remove the lenses from the treatment bath chamber 21 at the expiration of the preselected treatment period. If a gradient treatment is selected, the timer will control the timed step removal of the articles from the treatment bath chamber 21.

Alternatively, the articles may be manually placed into any one or more of the treatment bath chambers 21. In this case, a timer associated with that treatment bath chamber 21 may be used to track the amount of treatment time and to provide visual and/or auditory alarms at the end of the treatment period to indicate that it is time to manually remove the articles from that particular treatment bath chamber 21. Also, at the end of a treatment in a particular one of the baths 21, the indicator light 82 for that particular treatment bath chamber will flash and the system will also preferably make an audible signal. Optionally, one or two sets of articles can be supported by each support arm 50 and treated in two different treatment bath chambers at the same time, while at the same time, up to six or eight, respectively, other sets of articles can be manually treated in the other treatment bath chambers. Additional support arms 50 and/or lifting assemblies 40 could be added as desired.

In a further exemplary embodiment, the control system also preferably provides the ability for the arms to automatically move from treatment bath chamber to treatment bath chamber, to provide different treatments to articles being treated, for example by a stepper motor configured to rotate one or more of the lift assemblies 40 and controlled by a treatment sequence input using the keypad 80 or through a data input port.

The control system preferably includes a visual representation of each bath and lens dipping apparatus as they exist in the apparatus allowing the user to know what treatments are currently being run in which treatment baths chambers. The control system also preferably provides a visual indication of how long a set of articles has been in a particular treatment bath chamber, and can provide a visual and/or audio signal when a treatment is complete in any one of the treatment bath chambers.

In one exemplary embodiment, an eye doctor may prescribe a patient with a prescription for glasses having certain characteristics such as, for example, power, gradient, height, darkness (grade), color, hard coat (scratch resistant coat), UV coat, etc. The lens manufacturer could enter the prescription into a computer. The computer could send the appropriate information to the tint control system to set the parameters for the selected pair of lenses.

The link between the computer and the control system of the article treating machine 20 can be implemented using any known or later developed device or system for connecting the computer to the control system, including a direct cable connection, a connection over a wide area network or a local area network, a connection over an intranet, a connection over the Internet, or a connection over any other distributed processing network or system. In general, the link can be any known or later developed connection system or structure usable to connect the computer to the control system of the article treating machine 20. One possible connection is a RS232 port.

Figure 9:
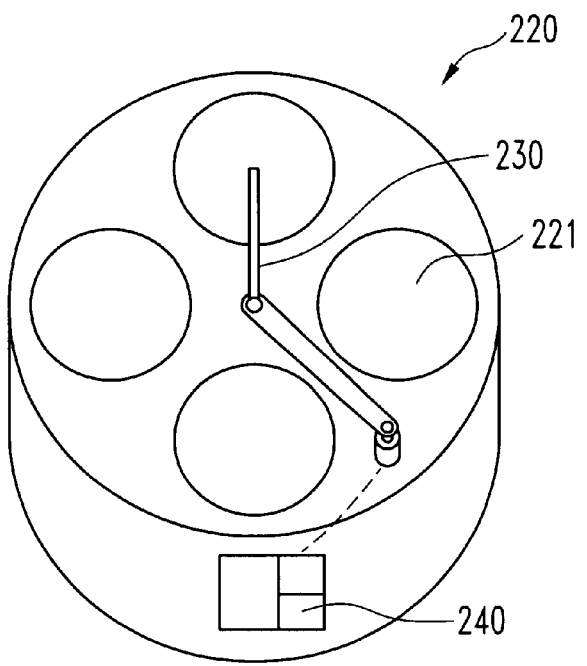
FIG. 9 is a perspective view of one exemplary embodiment of an article treating system in accordance with this invention.

In another exemplary embodiment, as illustrated in FIG. 9, a color scanner 240 may be provided which contains a coordinated tint lookup table. An individual can walk into a shop, and have an item such as an article of clothing scanned to determine its color. The control system will automatically select and program a sequence of neutralization, and one or more tinting and rinsing steps to tint an article to match or complement that determined color. In this exemplary embodiment, a round treatment machine 220 is preferably utilized with a central arm 230 which moves the articles from a front vat 221 to a second vat 221 as required to tint the article to the determined color. Jewelry, eyewear, eyewear frames or lenses, etc. may be tinted in accordance to this exemplary embodiment, as well as in the earlier described exemplary embodiments of the invention.

Figure 7:
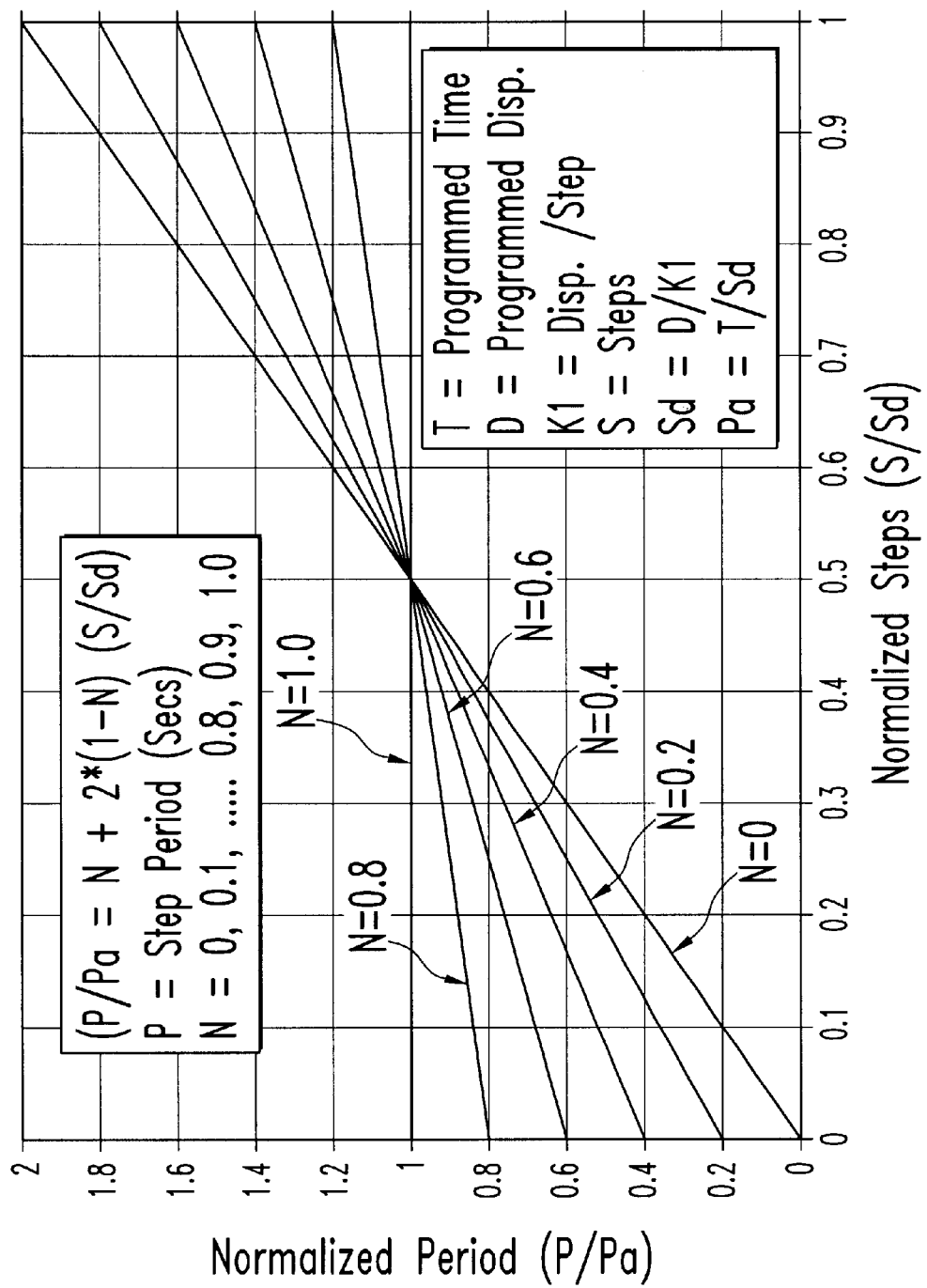
FIG. 7 is a graphical representation of selected curves which may be used in one exemplary embodiment of the methods of this invention to produce an assortment of gradient coatings on objects treated in an article treating apparatus of the present invention.

Using this invention, a different gradient as desired can be programmed into the control system. The stepper motor can be controlled to change its time/step over time to customize the gradient according to input or predetermined instructions. For example, different "fadeaway" gradients can be provided. FIG. 7 provides a graphical representation of some of the possible gradient curves which may be provided by the control system of the invention.

To use an exemplary embodiment of the gradient, the control system is programmed such that simultaneously pressing the "UP" and "DOWN" buttons 98 and 99 causes the display to read a number between 0 and 10. Pushing either the "UP" or "DOWN" button 98 or 99 will allow the user to pick from 1 of 11 different gradient curves, six of which are illustrated in FIG. 7. Six of the curves, N=0, N=0.2, N=0.4, N=0.6, N=0.8, and N=1.0, are shown. The other five curves, 0.1, 0.3, 0.5, 0.7, and 0.9, are intermediate the other six curves. A pair of lenses, for example, is inserted into a lens holder, with the lenses usually positioned upside down. Pushing the "ENTER" button and then the "DOWN" button 99 will cause the edge of the lenses to be brought down to the tint bath surface. Pushing the "ENTER" button again will cause the display 84 to display a nominal gradient depth, for example 25.0 mm. Again, the "UP" or "DOWN" button 98 and 99 is pushed until the desired gradient depth is shown on the display 84. Pushing the "ENTER" button will cause the control system to display on the display 84 a nominal treatment period, for example, ten minutes. Pushing the "TIME" button 86 will allow the treatment period to be adjusted to a desired time period. Pushing the "START/STOP" button 74 will cause the tinting treatment or other process to begin, with the lenses quickly immersed to the selected gradient depth and then slowly removed over the selected time period. The removal speed may change over the time period depending upon which of the gradient curves is selected. For example, if gradient curve 10 is selected, the removal speed will remain constant over the time period selected. If gradient curve 0 is selected, the removal speed from the bath will begin quickly and then continuously decrease over the time period selected. Gradient curves 1–9 will be intermediate between the two extremes represented by the gradient curves 0 and 10. Using the stepper motor 42, the articles are removed in incremental steps. The incremental steps are preferably less than about 0.025 inches and most preferably about 0.001 inches each.

In the Normalized Gradient Curves of FIG. 7, the "1" on the normalized period (Y-axis) represents the step speed (the total desired treatment time divided by the total number of steps). The "1" on the Normalized Steps (X-axis) represents the total number of steps. For example, if a treatment time of 6:00 (360 seconds) is selected, using a displacement (Disp.) of 0.001 inches per step and a 0.5 inch depth (which would require 500 steps for the article to exit the bath), the "1" on the X-axis would represent 500 steps. The "1" on the Y axis would represent a step period of 1.4 seconds/step (500 steps/360 seconds). If a gradient for curve N=1 is selected, each step of 0.001 inches out of the treatment bath would last 1.4 seconds. If the gradient curve for N=0 is selected, the early steps would occur very rapidly and the later steps would be much slower. Thus, for this example, the $50^{th}$ step, which would correspond with 0.1 on the Y-axis, would have a duration of 0.28 seconds (0.2×1.4). The duration of the $450^{th}$ step, which would correspond with 0.9 on the Y-axis, would be much longer at 2.5 seconds (1.8× 1.4).

By selecting from among different gradients, different "fadeaway" gradient coatings can be formed on lenses.

The invention also includes a power management system. In the article tinting machine 20 if all ten treatment bath chambers 21 are covered, if each treatment bath chamber is to be heated to about 200° F., and the heaters 30 are 225 watt heaters, it may not be possible to continuously heat all ten treatment bath chambers 21 using standard line voltage, i.e., 110 VAC, since 1800 watts would be the practical limit on a 110 VAC line. However, the power management system of this invention turns on a maximum of only eight of the 225 watt heaters 30 at one time. Which treatment bath chambers are heated at any one time is periodically rotated until all ten treatment bath chambers 21 are at the desired temperatures. At that time the heaters 30 are only periodically automatically turned on by the control system when the temperature of the liquid in a given treatment bath chamber 21 falls below a minimum temperature given for the desired temperature for that treatment bath chamber with no more than eight of the 225 watt heaters 30 on at a time. Since some of the treatment bath chambers 21 will likely be covered, all treatment bath chambers 21 will be controlled to keep them within their desired temperature range, even with most of the covers removed.

Upon activation, the control system can also automatically turn on and off the article tinting machine 20, automatically fill and empty the treatment bath chambers 21, provide different temperatures as necessary for the different treatment bath chambers 21, provide a timing mechanism for each treatment bath chamber 21 to indicate when or how long before the treatment is complete, and remove articles being treated after the treatment time has expired.

Figure 8:
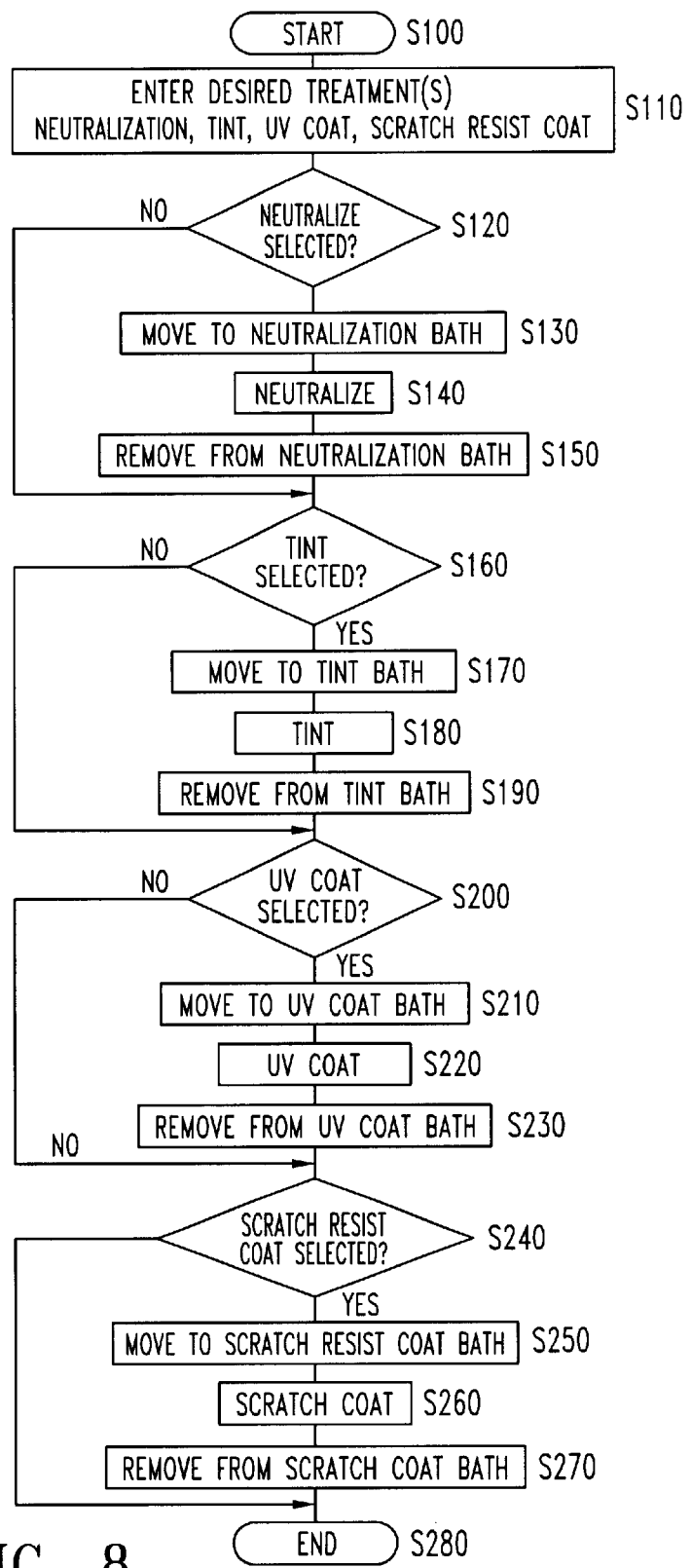
FIG. 8 is a flowchart outlining one exemplary embodiment of the methods for treating objects in accordance with this invention.

For example, a partially automatic management system may be programmed with various different parameters required for different treatment baths, such as tint coating, UV coating, scratch prevention coating, and neutralizer to remove color and the like in the different treatment bath chambers 21. FIG. 8 is a flow chart outlining one exemplary method for tinting an article according to this invention. As shown in FIG. 8, the method begins in step S100, and continues to step S110. In step S110, the desired treatments are entered. Then in step S120, the entered treatments are checked to determine if neutralization has been selected. If, in step S110, neutralization is selected, control continues to step S130. Otherwise, control jumps to step S160. In step S130 the article is transferred to be neutralized to a neutralization bath. Then, in step S140 the article is neutralized. Next, in step S150, the article is removed from the neutralization bath. Control then continues to step S160.

In step S160, the entered treatments are checked to determine if tinting has been selected. If tinting is selected, control continues to step S170. Otherwise, control jumps to step S200. In step S170, the article is transferred to a tinting bath. Next, in step S180, the article is tinted. Then, in step S190, the article is removed from the tint bath. The article can be removed rapidly or slowly, depending on the lifting time selected. Control then continues to step S200.

In step S200, the entered treatments are checked to determine if UV coating has been selected. If UV coating is selected, control continues to step S210. Otherwise, control jumps to step S240. In step S210 the article is transferred to the UV coating bath. Then, in step S220, the article is U coated. Next, in step S230, the article is removed from the UV coating bath. Control then continues to step S240.

In step S240, the entered treatments are checked to determine if scratch-resistant coating has been selected. If scratch resistant coating is selected, control continues to step S250. Otherwise control jumps to step S280. In step S250, the article is transferred to the scratch resistant coating bath. Next, in step S260, the article is scratch resistant coated. Then, in step S270, the article is removed from the scratch resistant coating bath. Control then continues to step S280. In step S280, the method ends.

Figure 10:
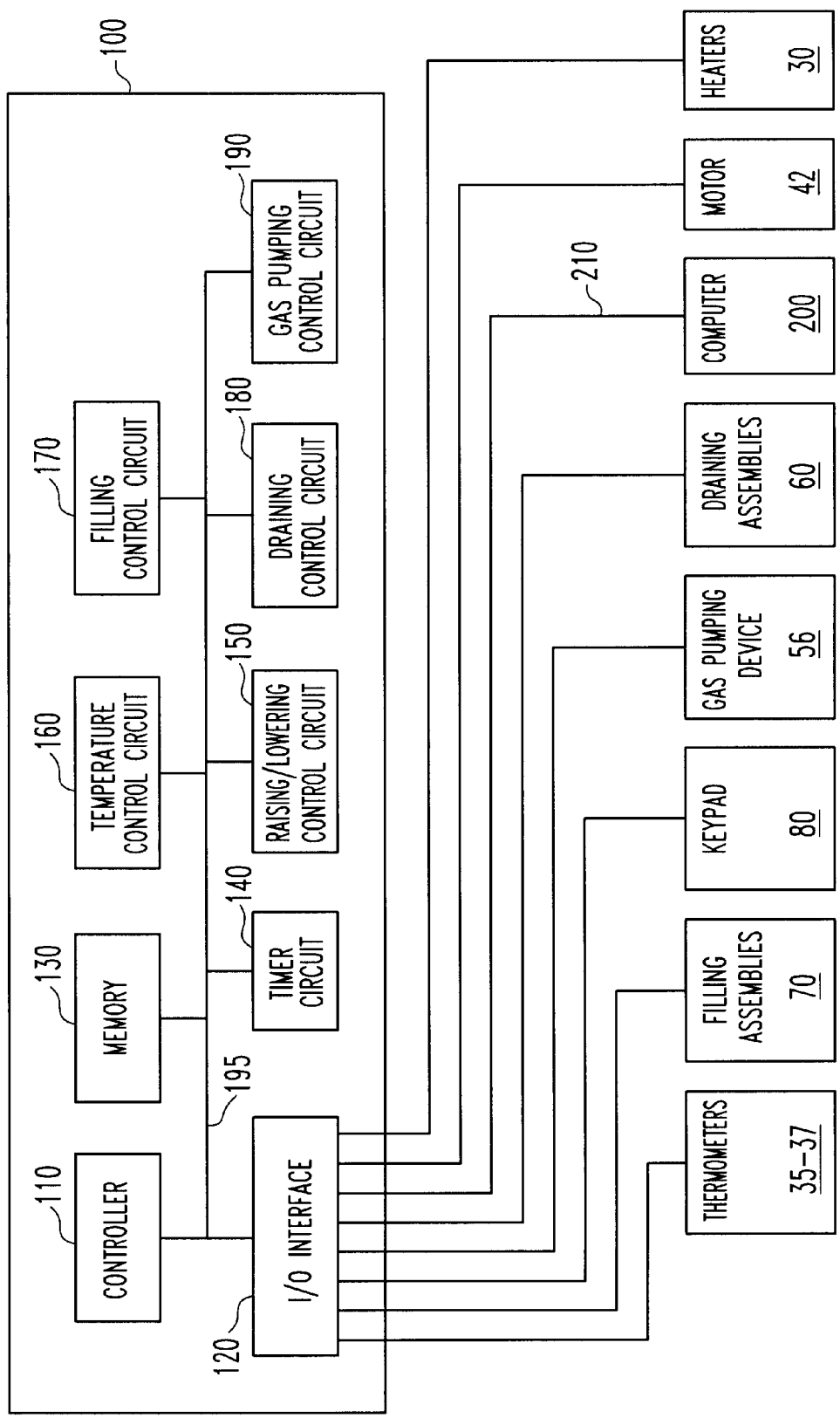
FIG. 10 is a functional block diagram outlining one exemplary embodiment of a control system according to this invention.

FIG. 10 is a functional block diagram outlining one exemplary embodiment of the control system described above. As shown in FIG. 10, the control system 100 includes a controller 110, an input output interface 120, a memory 130, a timer circuit 140, a raising/lowering control circuit 150, a temperature control circuit 160, a filling control circuit 170, a drain control circuit 180, a pumping control circuit 190, and a data and/or control bus 195 interconnecting all of the blocks 110–190. In addition, as shown in FIG. 10, the heaters 30, the thermometers 35–37, the draining assemblies 60 and the filling assemblies 70 for each of the treatment bath chambers 21 are connected to the input output interface 120. Similarly, each of the motors 42, the gas forming device 56 and the keypad 80 are also connected to the input output interface 120. Specifically, each of these elements 30–80 are connected to the input output interface using signal lines from the corresponding element of the article tinting machine 20. Finally, a computer 200 is connected over a link 210 to the input output interface. The link 210 can be the link previously discussed above with respect to the lens manufacturer.

The memory 130 stores any data input from the computer 200 over the link 210 and the control parameters entered using the keypad 80 under control of the controller 110. The memory 130 preferably has at least an alterable portion and may include a fixed portion. The alterable portion of a memory 130 can be implemented using static or dynamic RAM, a floppy disk drive, a hard disk and disk drive, flash memory or any other known or later developed alterable volatile or nonvolatile memory device. If the memory 130 includes a fixed portion, the fixed portion have been implemented using an ROM, a PROM, and EPROM, and an EEPROM, a CD-ROM and disk drive, a writable optical disk and disk drive, or any other known or later developed fixed or non-volatile memory device. The memory 130 stores any control routines or programs used by the control system 100 to implement any of the functions described herein. The memory 130 also stores any data values from the thermometers 35–37 after they are received and input through the input output interface 120 and before they are used by the temperature control circuit 160.

The timing circuit 140 receives timing data input through the keypad 180 for each of the treatment bath chambers 21. In particular, the timing circuit 140 has at least one timer and at least one timing register for each of the treatment bath chambers 21 of the article tinting machine 20. Alternatively, the timing circuit 140 has one timer for each treatment bath chamber 21 of the article tinting machine 20. In either case, when an article to be treated is submerged into one of the treatment bath chambers 21, the timer or timing register corresponding to that treatment bath chamber 21 is set to a treatment time input through the keypad 80 or from the computer 200 and stored in the memory 130. The timing circuit then causes the timer value in the corresponding timer or timing register to be decremented down to zero. When one of the timers or timing registers of the timing circuit 140 reaches 0, the controller 110 outputs a signal through the input output interface 120 to the keypad 80 to generate the audio or visual alarm signal and also indicates in which treatment bath the timer circuit has reached 0. The raising/lowering circuit 150 inputs the control parameters from the memory 130 and generates the proper driving signals for the motors 42 to raise and lower the articles to be treated into and out of the desired treatment bath chambers 21. The temperature control circuit 160, under control of the controller 110, inputs desired temperature levels from the keypad 80 or the memory 130 for particular ones of the treatment bath chambers 21. The temperature control circuit, also under control of the controller 110, inputs temperature signals from the thermometers 35–37 corresponding to those treatment bath chambers 21. Based on the desired temperature and the temperature signals from the thermometers for a particular treatment bath chamber 21, the temperature control circuit 160 outputs control signals to the corresponding heater 30 to either heat the treatment liquid stored in that treatment bath chamber 21, or to remove power from the corresponding heater 32 to stop heating the treatment liquid in that treatment bath chamber 21.

The filling control circuit 170, under control of the controller 110, based on the treatment bath parameters entered through the keypad 80 inserted in the memory 130, controls a filling assemblies 70 associated with each of the treatment bath chambers 21 to insure that the treatment bath chambers 21 that can be refilled, as described above, are periodically refilled. The draining control circuit 180, under control of the controller 110, inputs control parameters input through the keypad 80 and stored in the memory 130 to control the draining assembly 60 to controllably drain the treatment liquid from particular ones of the treatment bath chambers 21.

Finally, the gas pumping control circuit 190, under the controller 110, can input control signals from the keypad 80 or the computer 200 over the link 210 to controllably supply or cutoff the supply of gas to all or particular ones of the treatment bath chambers 21, as described above. The controller 110, based on the control parameters input through the keypad 80 and/or the computer 200, and/or stored in the memory 130, controls the various display lights 82, 85, 93, 95, 96 and 97 and the display 84 to provide status information about the various treatment operations being controlled by the control system 100, as described above.

The controller wiring and programming can readily be carried out as disclosed above by one of ordinary skill in the art without undue experimentation. The management system can control various attributes of the treating apparatus.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of the invention.

What is claimed is:

1. An article treatment apparatus, comprising:
a plurality of separate treatment bath chambers;
at least one heater for independently heating each treatment bath chamber; and
a control system configured to divide up an available amount of power, calculate if enough power is available to power all of selected heaters, and when enough power is not available, selectively rotate the application of power to the selected heaters.

2. The apparatus of claim 1, further comprising a lens holder for immersing an article in at least one treatment bath chamber.

3. A method of treating an article, comprising treating at least one article in the apparatus of claim 1.

4. The method of claim 3 wherein the at least one article is at least one lens and the treatment comprises applying a tint to the lens.

5. An article treatment apparatus, comprising:
a plurality of separate treatment bath chambers;
a control system configured to provide a visual or audible indication when a treatment is complete and in which of the treatment bath chambers the treatment is complete;
an individual heater for separately heating each treatment bath chamber; and
at least a first temperature sensor for measuring the temperature below an intended top surface level of a treatment liquid in the bath chamber, and a second temperature sensor located substantially at said intended top surface level;
whereby, when the liquid is approximately at the intended top surface level, each of the first temperature sensor and the second temperature sensor will respectively register a first and second temperature within a predetermined difference range, and when the level drops below the intended top surface level, and the difference between the first temperature sensor and the second temperature is outside of the predetermined range, the control system is configured to automatically control a filling of the treatment bath chamber to the intended top surface level.

6. The article treatment apparatus of claim 5, further comprising:
a third temperature sensor located above the intended top surface level;
wherein a difference between a third temperature sensed by the third temperature sensor and the first temperature or the second temperature is determined, and if the difference is within a predetermined range, the control system will prevent a further filling of the treatment bath chamber.

7. The apparatus of claim 5, further comprising a lens holder for immersing an article in at least one treatment bath chamber.

8. A method of treating an article, comprising treating at least one article in the apparatus of claim 5.

9. The method of claim 8 wherein the at least one article is at least one lens and the treatment comprises applying a tint to the lens.

10. An article treatment apparatus, comprising:
a plurality of separate treatment bath chambers;
at least one individual heater for independently heating each treatment bath chamber;
at least one temperature sensor for each treatment bath chamber; and
a control system which contains preprogrammed information about the proper conditions of different types of treatment compositions, and which includes inputs for inputting which type of treatment composition is in a treatment bath chamber, and wherein, when a type of treatment composition is input for any one of the treatment bath chambers, the system will automatically set said any one of the treatment bath chambers to the proper conditions.

11. The article treatment apparatus of claim 10, wherein the programmed information comprises different temperatures for different treatment bath compositions and whether the compositions are water based.

12. The article treatment apparatus of claim 11, wherein the programmed information comprises information that: normal tinting requires about 200° F. and is water based; hard coating requires about 205° F. and is not water based; neutralizing requires about 200° F. and is not water based; and UV coating requires about 205° F. and is water based.

13. The apparatus of claim 10, further comprising a lens holder for immersing an article in at least one treatment bath chamber.

14. A method of treating an article, comprising treating at least one article in the apparatus of claim 10.

15. The method of claim 14 wherein the at least one article is at least one lens and the treatment comprises applying a tint to the lens.

16. An article treatment apparatus, comprising:

a plurality of separate treatment bath chambers;

at least one article supporting and transferring member for supporting at least one article and for transferring the article into one of the bath chambers; and a control system configured to control the supporting and transferring member for automatically placing the article into a first selected bath chamber for an amount of time and then removing the article from the selected bath chamber; and the control system also being configured to control the transfer of the at least one article to another selected bath chamber and to control the automatic placement of the article in the second selected bath chamber for an amount of time.

17. The article treatment apparatus of claim 16, wherein the supporting and transferring member comprises at least one extended arm that can extend over a plurality of said treatment bath chambers.

18. The article treatment apparatus of claim 17 further comprising:

a stepper motor which provides a motive force for a raising and a lowering of the extended arm.

19. The article treatment apparatus of claim 18, wherein the stepper motor is a fixed stepper motor with a threaded shaft correspondingly engaged with an internally threaded rod.

20. The article treatment apparatus of claim 17, wherein the treatment bath chambers are circularly arranged around a central hub, the extended arm extending outwardly from the hub and the arm being able to pivot around and lower the article into any of the treatment bath chambers.

21. The article treatment apparatus of claim 20, further comprising: a coordinated tint look up table stored in the control system; and a scanner for scanning colors into the control system from articles.

22. The article treatment apparatus of claim 16, further comprising a timer for each of the separate treatment bath chambers and wherein the control system is able to provide a visual indication of the time an article has been in one of the separate treatment baths.

23. The article treatment apparatus of claim 22, wherein the control system is also able to provide an audible indication when an article has completed treatment.

24. The article treatment apparatus of claim 22, further comprising:

a stepper motor which provides the motive force for raising and lowering an extended arm.

25. The article treatment apparatus of claim 22, wherein the timer can be activated manually or automatically.

26. The article treatment apparatus of claim 16, wherein the integrated control system maintains the level of treatment liquid in each treatment bath chamber.

27. The article treatment apparatus of claim 16, wherein the article is at least one eyeglass lens.

28. The apparatus of claim 16, further comprising a lens holder for immersing an article in at least one treatment bath chamber.

29. A method of treating an article, comprising treating at least one article in the apparatus of claim 16.

30. The method of claim 29 wherein the at least one article is at least one lens and the treatment comprises applying a tint to the lens.

31. An article treatment apparatus, comprising:

a plurality of treatment chambers which can each hold a liquid treating composition;

a heating means fixed to the outside of each of said plurality of treatment chambers;

a control system for individually controlling the temperature of each said treatment chamber, for controlling the duration of time an article is maintained in said treatment chamber, for controlling the incremental raising of an article out of said treatment chamber, and for automatically draining and filling said treatment chamber;

a means for controlling the level of the liquid treating composition in each treatment bath chamber;

a means for agitating the liquid treating composition in each said chamber to keep the liquid treatment compositions in a mixed state;

a display panel for displaying inputs and outputs for said control system.

32. The article treatment apparatus of claim 31, wherein said means for controlling the level comprises a first temperature sensor for sensing the temperature at a first position within each said treatment chamber; a second temperature sensor for sensing the temperature at a different location within each said treatment chambers.

33. The article treatment apparatus of claim 31, wherein the means for agitating is an aerating system.

34. The article treatment apparatus of claim 31, further comprising a means for removing an article without upward and downward reciprocating movement over a period of time from at least one treatment bath chamber for forming a surface treatment gradient on an article.

35. The article treatment apparatus of claim 31, wherein the display means is a control system configured to provide a visual or audible indication when a treatment is complete and in which of the treatment bath chambers the treatment is complete.

* * * * *